United States Patent [19]

Biermann

[11] 4,272,389
[45] Jun. 9, 1981

[54] ABSORPTION HEAT PUMP WORK MEDIUM CONSISTING OF A SOLUTION OF A FLUOROCHLOROALKANE IN A SUBSTITUTED AMINO PHOSPHORUS OXIDE

[75] Inventor: Udo K. P. Biermann, Eindhoven, Netherlands

[73] Assignee: U.S. Philips Corporation, New York, N.Y.

[21] Appl. No.: 89,073

[22] Filed: Oct. 29, 1979

[30] Foreign Application Priority Data

Nov. 6, 1978 [NL] Netherlands ............. 7811002

[51] Int. Cl.³ ............................................. C09K 5/04
[52] U.S. Cl. ............................................................. 252/69
[58] Field of Search ............................ 252/69; 62/112

[56] References Cited

U.S. PATENT DOCUMENTS

| 2,149,937 | 3/1939 | Copley | 252/69 |
| 2,149,948 | 3/1939 | Zellhoefer | 252/69 |

OTHER PUBLICATIONS

Hainsworth, "Refrigerants and Absorbents", Part II, *Refrigerating Engineering*, Sep. 1944, pp. 201–205.

*Primary Examiner*—Harris A. Pitlick
*Attorney, Agent, or Firm*—Thomas A. Briody; William J. Streeter; Rolf E. Schneider

[57] ABSTRACT

A work medium for use in an absorption heat pump consists of a solution of a chlorofluoroalkane in a substituted amino phosphorus oxide. With such a work medium it is possible for an absorption heat pump to absorb heat at −20° C. and to give up heat at 70° C.

3 Claims, 4 Drawing Figures

ABSORPTION HEAT PUMP WORK MEDIUM CONSISTING OF A SOLUTION OF A FLUOROCHLOROALKANE IN A SUBSTITUTED AMINO PHOSPHORUS OXIDE

This invention relates to a work medium particularly intended for a heat pump of the absorption type, consisting of a solution of a fluorochloroalkane compound in a solvent.

Work media of this type are known per se from the literature.

See, for example, U.S. Pat. No. 2,040,901.

It is an object of the present invention to provide a work medium which satisfies the following requirements:

In using the work medium it must be possible to withdraw its heat from the environment at −20° C. or lower. The temperature at which the gaseous compound can be absorbed in the solvent in a quantity which is sufficient for the desired object must be between approximately 70° and 100° C.

The temperature at which the gaseous compound can be expelled from the solvent must be 200° C.±50° C.

The boiling point of the solvent is preferably above the temperature at which the gaseous compound is expelled from the solvent.

It has been found that these requirements can be satisfied by means of a work medium which is characterized in that the solvent consists of one or more compounds defined by the following chemical formula:

$$[(R_1R_2)N]_{3-x}(R_3)_xPO$$

wherein $R_1$, $R_2$ and $R_3$ may be methyl, ethyl, propyl, butyl, phenyl and cyclohexyl and, in addition, $R_3$ may be methoxy and ethoxy and x has a value of 0, 1 or 2, and/or consists of one or more compounds defined by the following chemical formula:

$$[(R_1R_2)N]_{4-p}(R_3)_pP_2O_3$$

wherein $R_1$, $R_2$, and $R_3$ may be methyl, ethyl, propyl, butyl, phenyl and cyclohexyl and, in addition, $R_3$ may be methoxy and ethoxy and p has a value of 0, 1, 2 or 3.

Representative solvents suitable for use in work media according to the invention are, for example:

| | |
|---|---|
| $[(CH_3)_2N]_3PO$ | tri(dimethylamino) phosphine oxide BP$_{lat}$ 235° C. |
| $[(CH_3)_2N]_4P_2O_3$ | BP$_{0.5\ Torr}$ 120–122° C. |
| $[(CH_3)_2N](C_2H_5O)_2PO$ | diethoxy-dimethylamine phosphine oxide |
| $CH_3[(CH_3)_2N]_2PO$ | methyl-di(dimethyl-amino) phosphine oxide BP$_{8\ Torr}$ 98° C. |

Chlorofluoroalkanes suitable for use in the work medium are particularly those compounds which contain at least one hydrogen atom, such as chlorodifluoromethane, fluorodichloromethane and chlorofluoromethane. Other compounds suitable for use are the chlorofluorine derivatives of ethane such as $CHFCl\text{-}CHF_2$, $CH_2Cl\text{-}CF_3$ and $CHF_2\text{-}CClF_2$.

The indicated solvents can dissolve considerable quantities of fluorochloroalkanes at the desired operating temperature of between 70° and 100° C. Substantial deviations from Raoult's law in the favourable sense then occur, that is to say the partial vapour pressure of the chlorofluoroalkane compounds over the solvents is much lower than would to be expected.

The invention will now be further described with reference to the accompanying drawings in which FIG. 1 shows schematically a heat pump.

Figure 1:
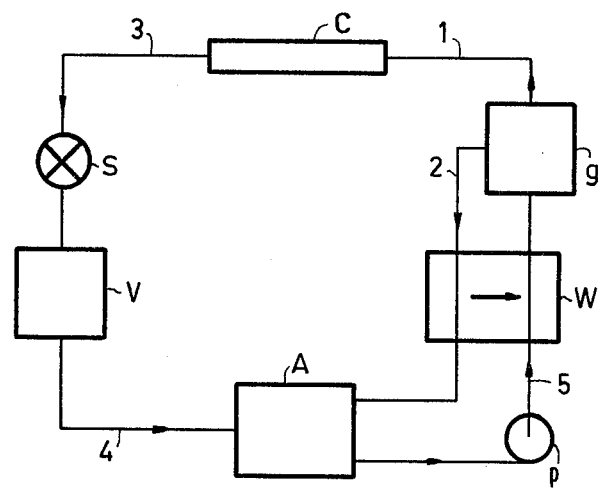

In the generator g the solution of the fluorochloroalkane in the solvent is heated to a temperature $T_g$, the vapour pressure of the chlorofluoroalkane being so high that at the operating temperature $T_c$ of the condenser C the chlorofluoroalkane which reaches the condenser C through the pipe 1 can condense, heat being given up to the object to be heated. Via the throttle valve S the liquid chlorofluoroalkane from pipe 3 is expanded at a low pressure in vaporizer V while withdrawing heat from the environment at a low temperature. The vaporous chlorofluoroalkane reaches the absorber A through the pipe 4. In the absorber A the chlorofluoroalkane compound is dissolved, while transferring heat to the object to be heated, in the dilute solution coming from the generator g through the pipe 2. The concentrated solution leaves the absorber A and is returned to the generator g by means of the pump p. When flowing through the pipe 2, the dilute solution exchanges heat with the concentrated solution in the pipe 5 by means of the heat exchanger W. If the system also includes hydrogen or an inert gas, the mechanical pump p may be replaced by a vapour bubble pump.

Figure 2:
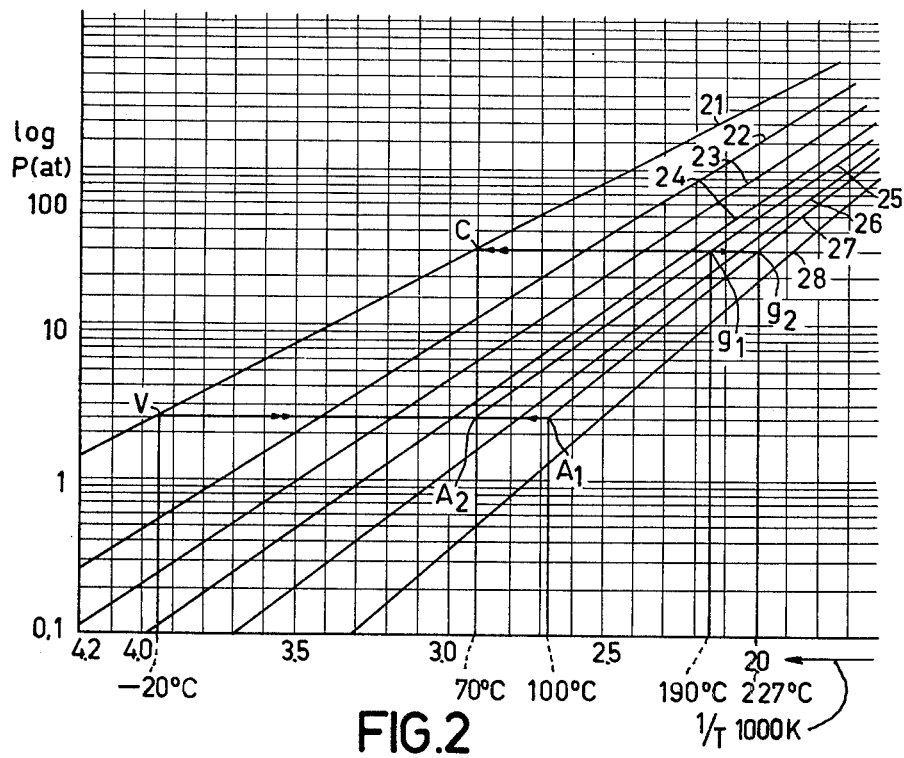
FIGS. 2 and 3 are graphs showing the relationship between log P and 1/T of two different work media according to the invention.

FIG. 2 is a graph showing the cycle in a log p−1/T diagram. The lines 21 to 28 inclusive show the relationship between the vapour pressure P over the liquids having the following composition line 21: 100% by weight of chlorodifluoromethane ($CHClF_2$)
line 22: 50% by weight $CHClF_2$, 50% by weight tri(dimethylamine) phosphine oxide
line 23: 40% by weight $CHClF_2$, 60% by weight $[(CH_3)_2N]_3PO$
line 24: 30% by weight $CHClF_2$, 70% by weight $[(CH_3)_2N]_3PO$
line 25: 27% by weight $CHClF_2$, 73% by weight $[(CH_3)_2N]_3PO$
line 26: 20% by weight $CHClF_2$, 80% by weight $[(CH_3)_2N]_3PO$
line 27: 16% by weight $CHClF_2$, 84% by weight $[(CH_3)_2N]_3PO$
line 28: 10% by weight $CHClF_2$, 90% by weight $[(CH_3)_2N]_3PO$ The diagram indicates the operation of a heat pump which withdraws heat from the environment at a temperature of −20° C. and a pressure of 2.5 atmospheres in the vaporizer V. The chlorodifluoromethane vapour is absorbed in the absorber in a chlorodifluoromethane-poor solution (consisting of 16% by weight of chlorodifluoromethane, remainder tri(dimethylamino)phosphine oxide) at a temperature of between 70° and 100° C. ($A_1$–$A_2$). The saturated solution, which has a temperature of 70° C. and a composition of 27% by weight of chlorodifluoromethane, remainder tri(dimethylamino)-phosphine oxide, is pumped to the generator wherein the chlorodifluoromethane is removed by vaporization between 190° and 227° C. ($g_1$–$g_2$). The vapour has a pressure of 30 atmospheres and condenses in the condenser C, which is in heat-exchanging contact with the object to be heated at a temperature of 70° C. Through the pipe 2 the poor solution is returned to the absorber via the heat exchanger W. The poor solution reaches the absorber at a temperature of 100° C., by the exchange of heat with the object to be heated (for example a pipe-heating system); the temperature of the solution in the absorber decreases to 70° C.

Figure 3:
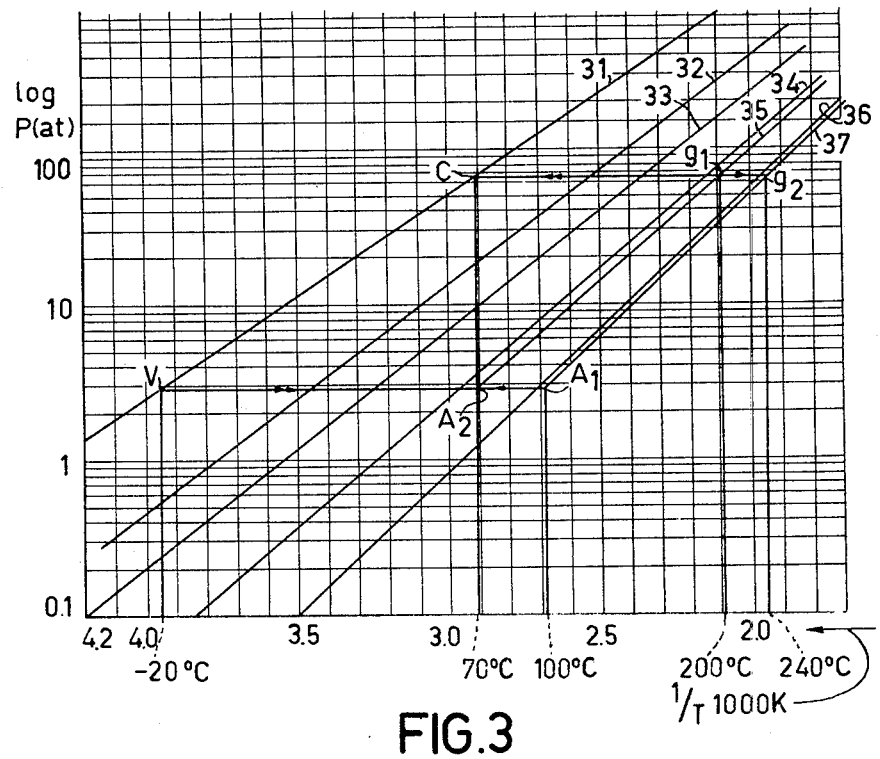

FIG. 3 shows a diagram similar to that of FIG. 2. The chlorofluoroalkane compound consists of dichlorofluoromethane. The lines 31 to 37, inclusive, relate to liquids consisting of 100% by weight, 40% by weight, 30% by weight, 20% by weight, 18% by weight, 10% by weight and 9% by weight $CHCl_2F$, remainder tri(dimethylamino)phosphine oxide, respectively. The pressure in the condensor C is 6.8 atmospheres, in the vaporizer V, 0.28 atmosphere. The temperatures in the absorber A are between 70° and 100° C., in the generator g between 200° and 240° C. and in the condensor approximately 70° C.

Figure 4:
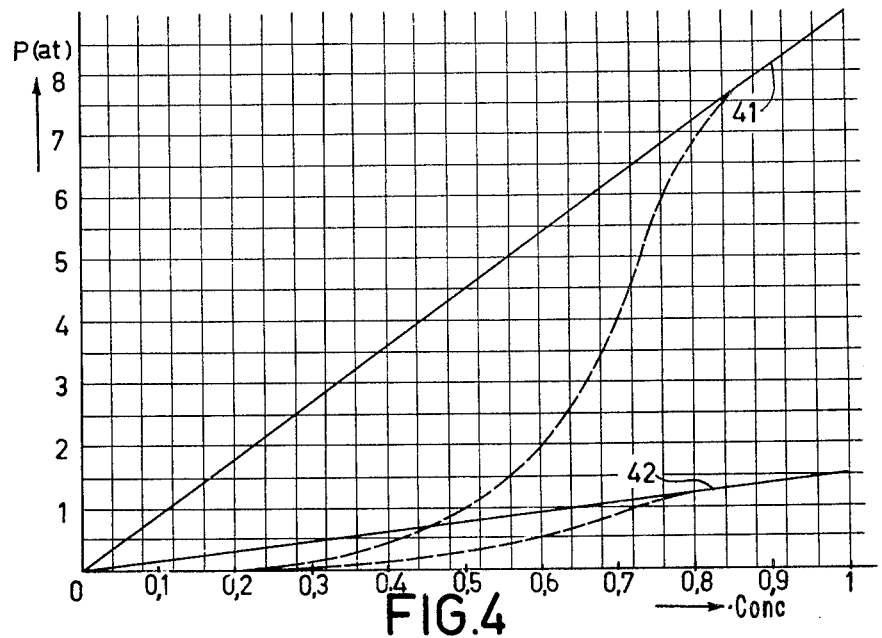
FIG. 4 shows in the form of a graph the deviation from Raoult's law.

FIG. 4 shows the deviation from Raoult's law for solutions at 20° C. on several concentrations plotted on the horizontal axis in mole fractions. Line 41 refers to $CHClF_2$ in tri(dimethylamino)phosphine oxide. Line 42 refers to $CHCl_2F$ in tri(dimethylamino)phosphine oxide. The pressure over the solution in atmospheres is shown on the vertical axis. The straight lines indicate the pressures of the halogenated alkanes as they should be found if Raoult's law were satisfied. The curved lines indicate the pressures as they are actually found.

What is claimed is:

1. A work medium for use in an absorption heat pump, which consists of a solution of a fluorochloroalkane in a solvent consisting of (a) at least one substituted amino phosphorus oxide compound having the general formula:

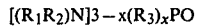

and/or (b) at least one substituted amino phosphorus oxide compound having the general formula:

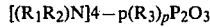

wherein $R_1$, $R_2$, and $R_3$ are methyl, ethyl, propyl, butyl, phenyl or cyclohexyl and, in addition, $R_3$ is methoxy or ethoxy; x is an integer from 0 to 2; and p is an integer from 0 to 3.

2. A work medium according to claim 1, in which the solvent is tri(dimethylamino) phosphine oxide.

3. A work medium according to claim 1 or 2, in which the fluorochloroalkane is dichlorofluoromethane, difluorochloromethane or fluorochloromethane.

* * * * *

UNITED STATES PATENT AND TRADEMARK OFFICE
CERTIFICATE OF CORRECTION

PATENT NO. : 4,272,389
DATED : June 9, 1981
INVENTOR(S) : UDO K.P. BIERMANN

It is certified that error appears in the above—identified patent and that said Letters Patent is hereby corrected as shown below:

In column 1, line 30, the formula should be:

$$[(R_1R_2)N]_{3-x}(R_3)_xPO$$

In column 1, line 40, the formula should be:

$$[(R_1R_2)N]_{4-p}(R_3)_pP_2O_3$$

In column 4, line 11, the formula should be:

$$[(R_1R_2)N]_{3-x}(R_3)_xPO$$

In column 4, line 16, the formula should be:

$$[(R_1R_2)N]_{4-p}(R_3)_pP_2O_3$$

Signed and Sealed this

Tenth Day of May 1983

[SEAL]

Attest:

GERALD J. MOSSINGHOFF

Attesting Officer

Commissioner of Patents and Trademarks